United States Patent
Becker et al.

(10) Patent No.: US 11,199,167 B2
(45) Date of Patent: Dec. 14, 2021

(54) FUEL PUMP HAVING A MOTOR HOUSING AND PUMP HOUSING AGAINST ONE ANOTHER

(71) Applicant: CPT GROUP GMBH, Hannover (DE)

(72) Inventors: Dirk Becker, Alheim (DE); Michael Bämpfer, Rotenburg (DE); Jens Missun, Baunatal (DE); Marc Völker, Magdeburg (DE)

(73) Assignee: Vitesco Technologies GmbH, Hannover (DE)

( * ) Notice: Subject to any disclaimer, the term of this patent is extended or adjusted under 35 U.S.C. 154(b) by 244 days.

(21) Appl. No.: 16/343,362

(22) PCT Filed: Oct. 5, 2017

(86) PCT No.: PCT/EP2017/075277
§ 371 (c)(1),
(2) Date: Apr. 18, 2019

(87) PCT Pub. No.: WO2018/073008
PCT Pub. Date: Apr. 26, 2018

(65) Prior Publication Data
US 2019/0242340 A1  Aug. 8, 2019

(30) Foreign Application Priority Data

Oct. 20, 2016  (DE) .................. 10 2016 220 641.9

(51) Int. Cl.
*F04C 15/00*  (2006.01)
*F04C 2/16*  (2006.01)
(Continued)

(52) U.S. Cl.
CPC ............. *F02M 37/08* (2013.01); *F01C 21/10* (2013.01); *F02M 37/0017* (2013.01); *F04C 2/16* (2013.01);
(Continued)

(58) Field of Classification Search
CPC .... F01C 21/10; F02M 37/0017; F02M 37/08; F04C 2/16; F04C 15/0073; F04C 15/008;
(Continued)

(56) References Cited

U.S. PATENT DOCUMENTS 4,013,053 A * 3/1977 Dinkelkamp .......... F02M 37/08
                                                        417/200
4,619,591 A    10/1986 Iwai
(Continued)

FOREIGN PATENT DOCUMENTS

| CN | 1414246 | 4/2003 |
|----|---------|--------|
| CN | 1676915 | 10/2005 |

(Continued)

OTHER PUBLICATIONS

English translation of DE10004709 by Espacenet May 26, 2021.*
(Continued)

*Primary Examiner* — Deming Wan
(74) *Attorney, Agent, or Firm* — Cozen O'Connor (57) ABSTRACT

A fuel pump, in which a connecting piece for a fuel line and electrical connecting lines are radially guided in a motor housing, includes an electric motor. The motor housing has a section made of plastic such that the fuel pump has reduced axial dimensions.

3 Claims, 8 Drawing Sheets

(51) Int. Cl.

| | |
|---|---|
| *F01C 21/10* | (2006.01) |
| *F02M 37/00* | (2006.01) |
| *F02M 37/08* | (2006.01) |
| *H02K 5/12* | (2006.01) |
| *H02K 5/08* | (2006.01) |
| *H02K 5/04* | (2006.01) |
| *H02K 7/14* | (2006.01) |
| *F04C 13/00* | (2006.01) |
| *F04C 15/06* | (2006.01) |

(52) U.S. Cl.
CPC .......... *F04C 13/001* (2013.01); *F04C 15/008* (2013.01); *F04C 15/0073* (2013.01); *F04C 15/06* (2013.01); *H02K 5/04* (2013.01); *H02K 5/08* (2013.01); *H02K 5/12* (2013.01); *H02K 7/14* (2013.01); *F04C 2210/1044* (2013.01); *F04C 2240/30* (2013.01); *F04C 2240/40* (2013.01); *H02K 2213/03* (2013.01)

(58) Field of Classification Search
CPC . F04C 15/06; H02K 5/04; H02K 5/08; H02K 7/14
See application file for complete search history.

(56) References Cited

U.S. PATENT DOCUMENTS

| | | | | |
|---|---|---|---|---|
| 4,690,366 | A * | 9/1987 | Loup | H02K 5/225 248/676 |
| 2004/0033153 | A1* | 2/2004 | Maruyama | F04C 18/16 418/201.1 |
| 2004/0052663 | A1* | 3/2004 | Laing | G06F 1/20 417/423.8 |
| 2006/0017339 | A1* | 1/2006 | Chordia | H02K 5/128 310/86 |
| 2008/0298985 | A1* | 12/2008 | Gettel | F02M 37/10 417/410.1 |
| 2009/0016912 | A1* | 1/2009 | Barth | F04C 2/102 417/410.1 |
| 2009/0272364 | A1 | 11/2009 | Vu | |
| 2012/0224991 | A1* | 9/2012 | Lipinski | F04C 15/0069 418/166 |

FOREIGN PATENT DOCUMENTS

| | | | | |
|---|---|---|---|---|
| CN | 201090534 Y | 7/2008 | | |
| CN | 201705517 U | 1/2011 | | |
| CN | 102052217 | 5/2011 | | |
| CN | 102705118 | 10/2012 | | |
| DE | 20 10 207 | 9/1971 | | |
| DE | 00002010207 | 9/1971 | | |
| DE | 4240752 | 7/1993 | | |
| DE | 10004709 | * | 8/2001 | ............ B62D 5/062 |
| GB | 2 185 536 | 7/1987 | | |
| JP | 2005-315234 | 11/2005 | | |
| JP | 2005-315243 | 11/2005 | | |
| JP | 53-38733 B2 | 11/2013 | | |
| KR | 2012-0109298 | 10/2012 | | |
| WO | WO 03/083311 | 10/2003 | | |

OTHER PUBLICATIONS

Office Action dated Apr. 2, 2020 issued in Korean Patent Application No. 10-2019-7014317.

International Search Report issued in corresponding PCT Application No. PCT/EP2017/075277.

Written Opinion issued in corresponding PCT Application No. PCT/EP2017/075277.

Notice of Allowance dated Oct. 27, 2020 issued in Korean Patent Application No. 10-20197014317.

* cited by examiner

FUEL PUMP HAVING A MOTOR HOUSING AND PUMP HOUSING AGAINST ONE ANOTHER

CROSS REFERENCE TO RELATED APPLICATIONS

This is a U.S. national stage of application No. PCT/EP2017/075277, filed on Oct. 5, 2017, which claims priority to German Application No. 10 2016 220 641.9, filed Oct. 20, 2016, the content of each of which is incorporated herein by reference.

BACKGROUND OF THE INVENTION

1. Field of the Invention

The present invention relates to a fuel pump having an electric motor and having a pump stage.

2. Description of the Prior Art

Such fuel pumps are frequently used in modern motor vehicles and are known from practice. In the case of the known fuel pump, the preload element is formed as a sheet-metal casing. The electric motor and the pump stage are rolled together with the sheet-metal casing such that both the electric motor and the pump stage are encapsulated and at the same time sealingly enclosed. A pressure-side interface to the electric motor, on the one hand, and a suction-side arrangement of an axially acting seal or axial seal, on the other hand, influence a bracing of the pump stage that occurs during the rolling of the sheet-metal casing. Here, this bracing extends over the entire pump stage and leads to a statically overdeterminate or indeterminate installation situation of the pump stage.

The pump stage of the fuel pump may be in the form of a peripheral pump, a side-channel pump or a screw pump.

A disadvantage in the case of the known fuel pump is, however, that the sheet-metal casing constitutes a very expensive component. Furthermore, the sheet-metal casing closes the radial circumference of the electric motor and of the pump stage, such that all connections are led away from the fuel pump axially. The known fuel pump therefore has particularly large axial dimensions. Large axial dimensions are however very disruptive if the fuel pump is to be arranged within a fuel tank.

SUMMARY OF THE INVENTION

An object of the invention is to solve the problem of further developing the prior art fuel pump of the type having a motor housing of the electric motor, having a pump housing of the pump stage, and having a preload element which preloads the motor housing and the pump housing against one another, wherein the motor housing is designed to hold a stator, which surrounds a rotor, of the electric motor and holds a connector piece for a fuel line, such that it has particularly small dimensions.

This problem may be solved according to one aspect of the invention in that at least one of the components of the connector piece or connection lines leading to the electric motor are led into the electric motor via a shell surface of the motor housing.

By this configuration, it is possible to avoid a configuration in which the connector piece for the fuel line and/or the electrical connection of the fuel pump are/is led away via the end side. Since the connector piece and/or the connection lines are/is led away from the motor housing radially, the fuel pump has particularly small axial dimensions. By this configuration, the fuel pump can be arranged even in fuel tanks of low height.

According to one advantageous refinement of the invention, it is conducive to a further reduction of the dimensions of the fuel pump if the connector piece is arranged at the axial height of coils or permanent magnets of the stator. The connector piece is preferably furthermore led away from the motor housing radially.

According to another advantageous refinement of the invention, the number of components of the fuel pump can be kept particularly low if the motor housing has a portion made of plastic that holds the stator. That plastic portion of the motor housing preferably has the connector piece for the fuel line. A cover, which must be separately mounted, for the connector piece is thus avoided.

According to another advantageous refinement of the invention, channels for conducting fuel through the fuel pump can be manufactured particularly easily if a cover, which leads to the connector piece, of a channel is sealed off on the plastic portion of the motor housing. In this case, the cover may have the connector piece.

According to another advantageous refinement of the invention, the plastic portion of the motor housing can be manufactured in a particularly simple tool mold if a portion of the fuel-conducting channel is led, parallel to the axis of the rotor, from the end averted from the pump housing into the motor housing.

According to another advantageous refinement of the invention, the fuel pump can be manufactured particularly inexpensively if the preload element is formed as a sheet-metal casing, in that the sheet-metal casing engages behind an edge of the pump housing and behind an edge arranged at that side of the motor housing that faces toward the pump housing. By this arrangement, the sheet-metal casing extends only from that edge of the motor housing which faces toward the pump housing as far as over the pump housing. As a result of this arrangement, the predominant region of the electric motor is not surrounded by the sheet-metal casing. The sheet-metal casing can thus be designed to be particularly short. The fuel pump according to the invention can therefore be manufactured particularly inexpensively.

According to another advantageous refinement of the invention, the fuel pump can be manufactured particularly inexpensively if the height of the sheet-metal casing amounts to at most 50% of the sum of the heights of the pump housing and of the motor housing.

In the case of known fuel pumps, connection contacts of the stator are generally flowed around by fuel. To prevent corrosion, very expensive seals and coatings of the connection contacts are known. According to another advantageous refinement of the invention, expensive seals of connection contacts of the electric motor can be easily avoided if connection contacts of the stator are sealingly enclosed by the plastic of the plastic portion of the motor housing. That portion of the motor housing made from plastic is preferably manufactured in a particularly inexpensive manner in an injection molding process.

According to another advantageous refinement of the invention, it is conducive to a reduction of the axial structural height of the fuel pump if connection lines leading to the electric motor are led radially into the plastic portion of the motor housing.

According to another advantageous refinement of the invention, the assembly of the fuel pump is made particularly simple if that portion of the motor housing which holds the stator has an open side, facing toward the pump housing, for the insertion of a rotor. By this configuration, the electric motor can be installed from one side, specifically the side facing toward the pump stage.

According to another advantageous refinement of the invention, a bearing arrangement, which must be separately installed, of the rotor of the electric motor can be avoided if the rotor of the electric motor is mounted with one end on the pump housing and with the other end in the plastic portion of the motor housing.

According to another advantageous refinement of the invention, the fuel pump is of particularly simple structural design if the portion made of plastic has support arms for supporting the bearing arrangement of the rotor, and in that a channel for conducting the fuel leads through between the support arms.

According to another advantageous refinement of the invention, the seal of the fuel pump is of particularly simple structural design if a sealing ring with radial sealing action is arranged between the pump housing and the sheet-metal casing. The sealing ring may be formed as an elastomer O-ring. Alternatively, the sealing ring may also be formed as a round cord ring. Such round cord rings are manufactured as a cord in an extrusion process and connected together in butt-jointed fashion by adhesive bonding or vulcanization.

BRIEF DESCRIPTION OF THE DRAWINGS

The invention permits numerous embodiments. To further illustrate its basic principle, two of these embodiments are illustrated in the drawings and will be described below. In the drawings.

DETAILED DESCRIPTION OF THE PRESENTLY PREFERRED EMBODIMENTS

Figure 1:
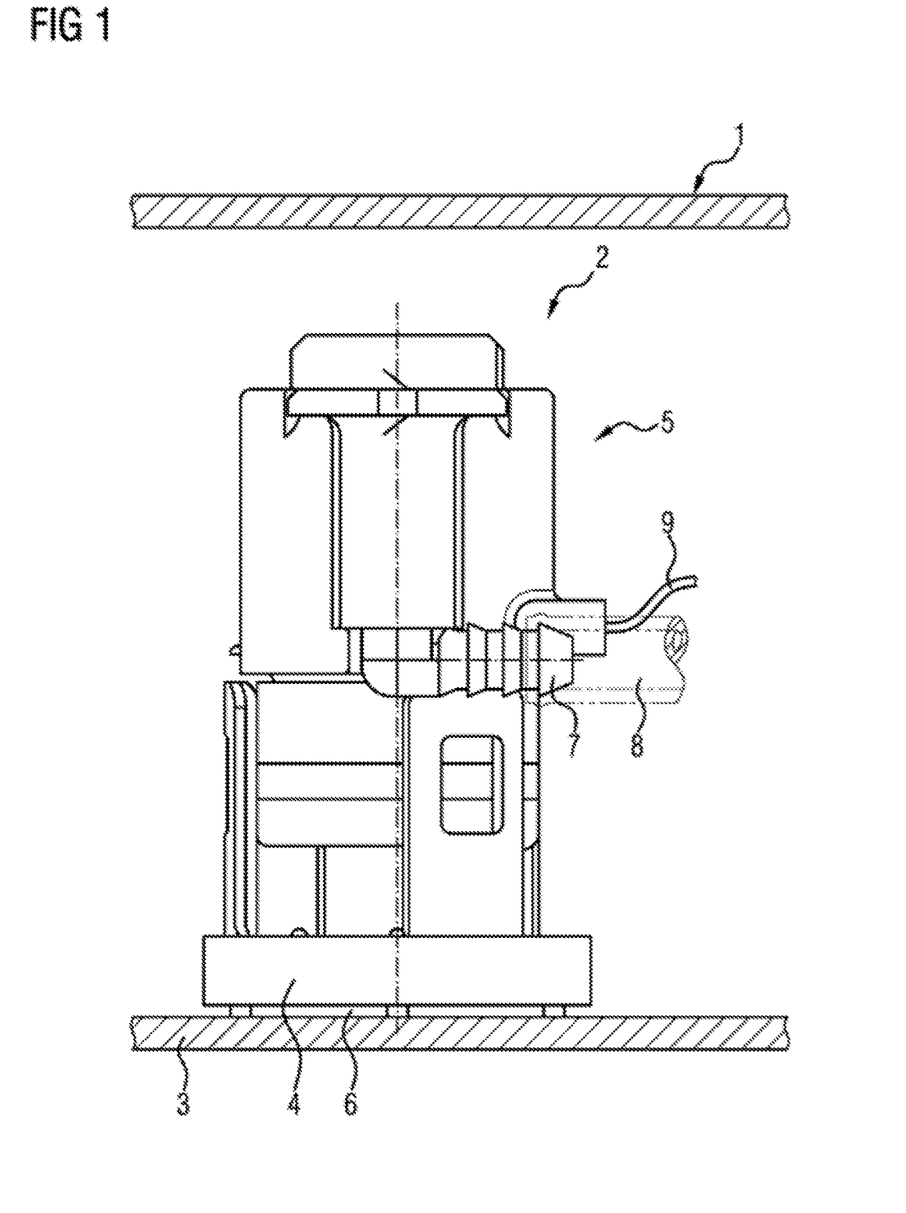
FIG. 1 shows a fuel delivery unit installed in a fuel tank.

FIG. 1 shows a subregion of a fuel tank 1, illustrated in section, with a fuel delivery unit arranged therein. The fuel delivery unit 2 has a holder 4, which is preloaded against the base 3 of the fuel tank 1, for a fuel pump 5 with a prefilter 6. A connector piece 7 for connection to a fuel-discharging fuel line 8 is led radially away from the fuel pump 5. Electrical connection lines 9 for the supply of electrical current to the fuel pump 5 are likewise led radially away from the fuel pump 5. The connector piece 7 and the connection lines 9 are arranged in an axial central region of the fuel pump 5.

Figure 2:
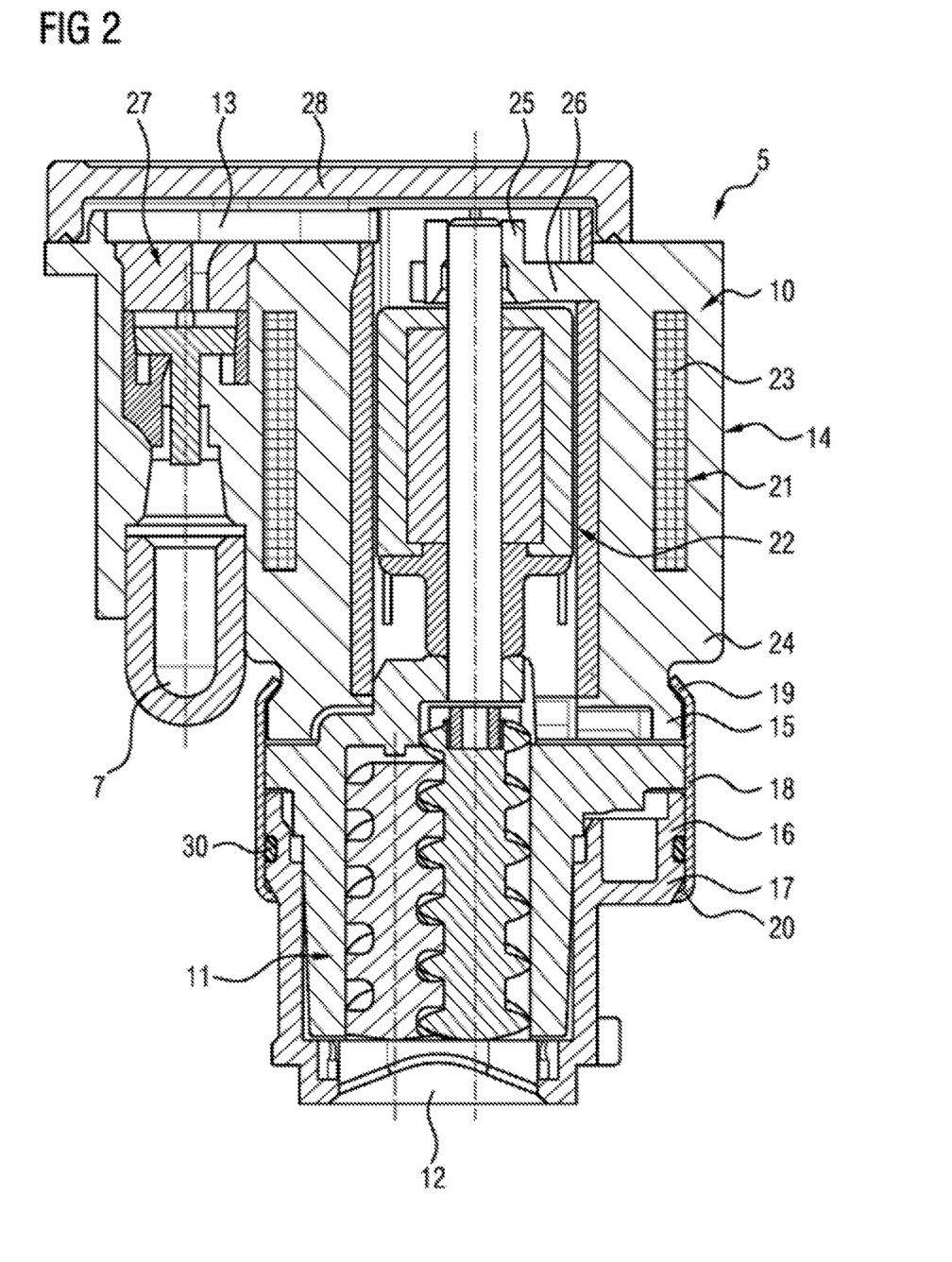
FIG. 2 shows a longitudinal section through a fuel pump of the fuel delivery unit from FIG. 1.

FIG. 2 shows a longitudinal section through the fuel pump 5 from FIG. 1. It can be seen here that an electric motor 10 drives a pump stage 11. The pump stage 11 draws fuel in via an intake connector 12 and delivers this fuel through the electric motor 10 via a channel 13 to the connector piece 7.

The electric motor 10 has a manufactured motor housing 14 with an edge 15 facing toward the pump stage 11. The pump stage 11 has a pump housing 16 with, likewise, an edge 17. A sheet-metal casing 18 engages behind the edges with, in each case, one rolled portion 19, 20 and thus preloads the pump housing 16 against the motor housing 14.

The electric motor 10 has a stator 21 and a rotor 22 connected to the pump stage 11. Coils 23 or permanent magnets of the stator 11 are arranged within, and encapsulated by, a portion 24 of the motor housing that is made of from plastic. The rotor 22 is mounted in the pump stage 11 and has a further bearing arrangement 25 in the end, averted from the pump stage 11, of the plastic portion 24 of the motor housing 14. The bearing arrangement 25 is held by multiple support arms 26 of the motor housing 14. Between the support arms 26, the fuel flows from the pump stage 11 to the connector piece 7.

In the channel 13 provided for conducting fuel, there is arranged a check valve 27. The channel 13 is closed off, at a portion 24 arranged in that side of the motor housing 14 which is averted from the pump stage 11, by a cover 28. The cover 28 is sealingly connected to the plastic portion 24 of the motor housing 14. The sealing connection is produced, for example, in a welding process or by adhesive bonding. A sealing ring 30, which is formed, for example, as an O-ring or as a round cord ring, seals off the pump housing 16 radially with respect to the sheet-metal casing 18.

By the radial seal of the pump housing 16 with respect to the sheet-metal casing 18, a floating centering of the pump stage is realized. Furthermore, the rolled region of the sheet-metal casing 18 on the pump stage 16 can be displaced toward the pressure side of the pump stage 16, such that the length of the sheet-metal casing 18 can be further reduced.

Figure 3:
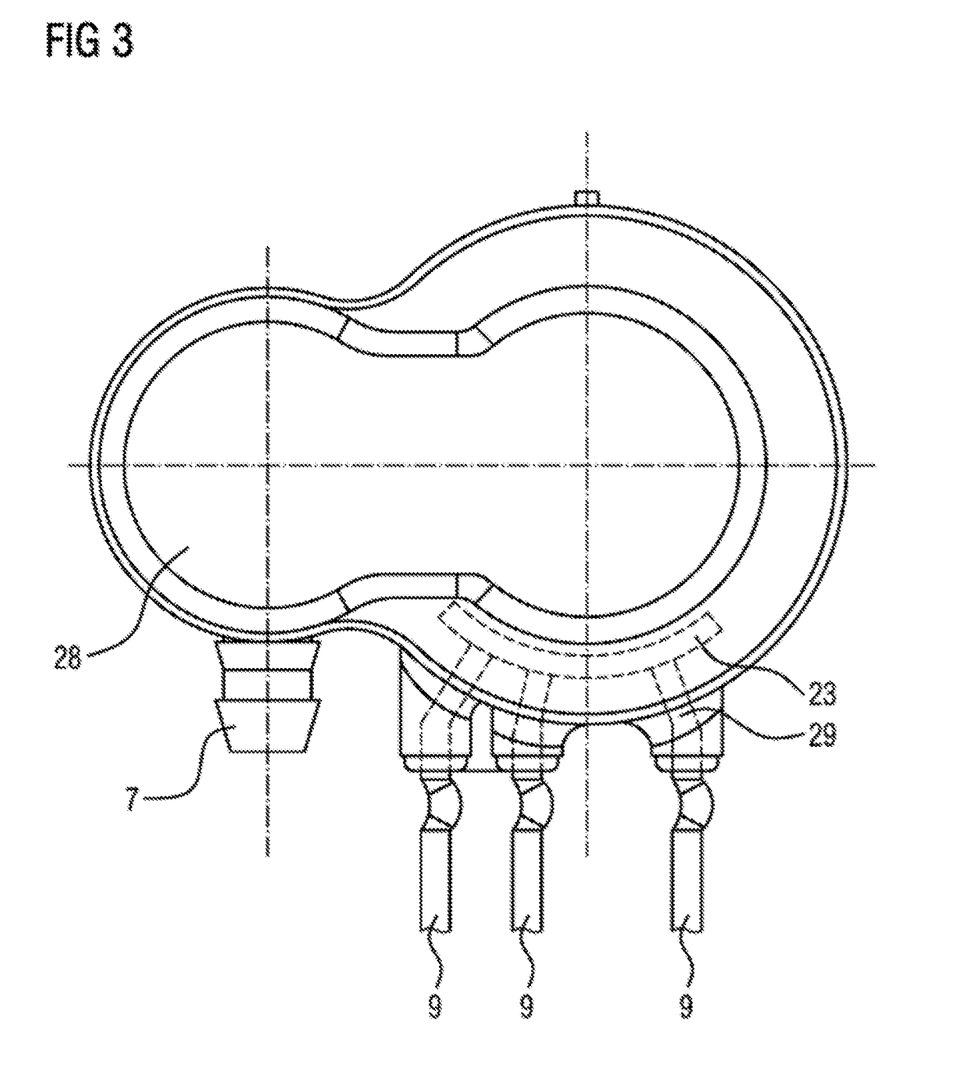
FIG. 3 shows a plan view of the fuel pump from FIG. 2.

FIG. 3 shows the fuel pump 5 in a plan view directed toward the cover 28. It can be seen in this view that the connection lines 9 are led into plastic portion 24 of the motor housing 14, and are partially encapsulated by this plastic portion. Likewise, connection contacts 29 which produce a conductive connection of the fuel pump 5 to the connection lines 9 are encapsulated by the plastic of the plastic portion 24 of the motor housing 14.

Figure 4:
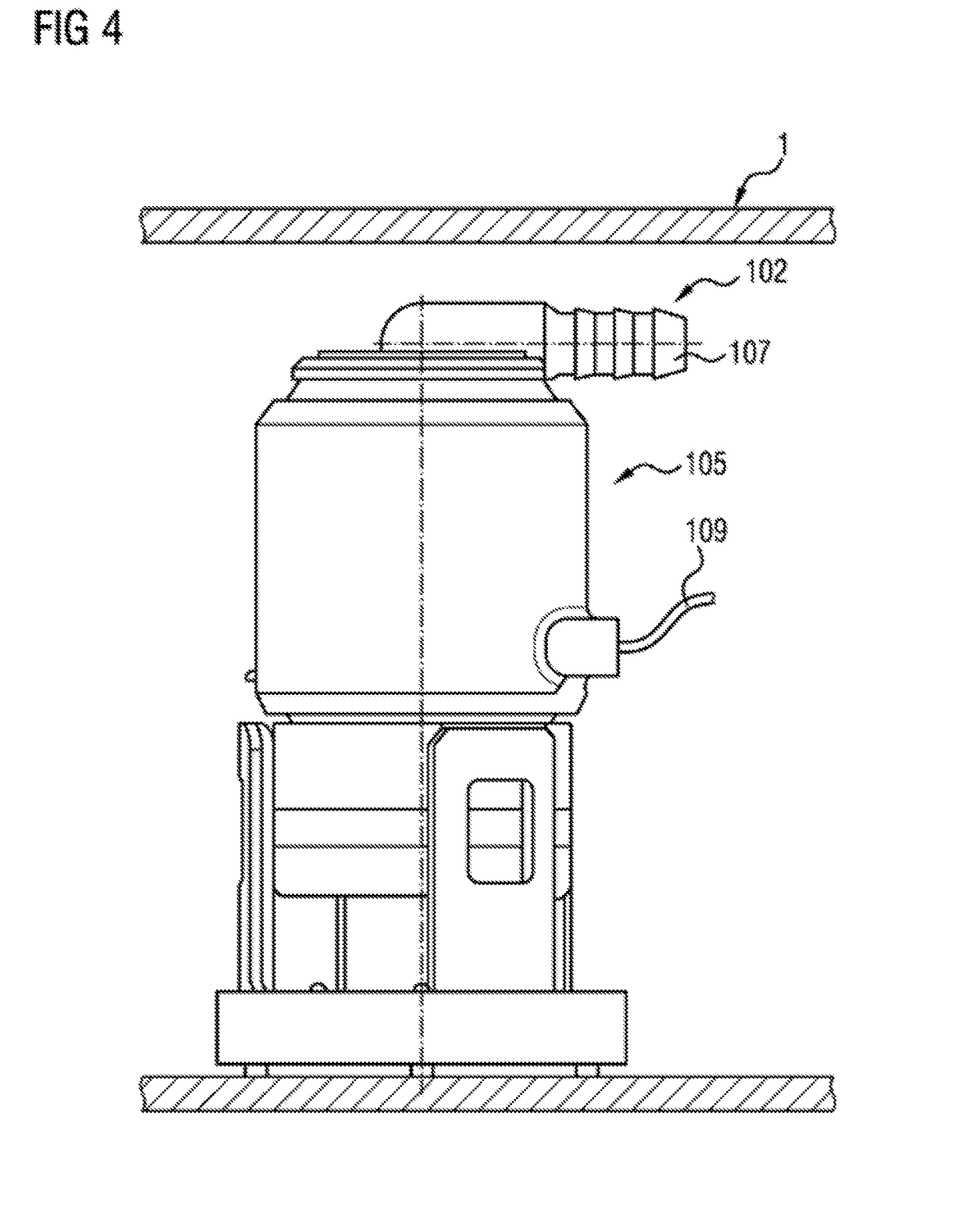
FIG. 4 shows a fuel delivery unit installed in a fuel tank.
Figure 5:
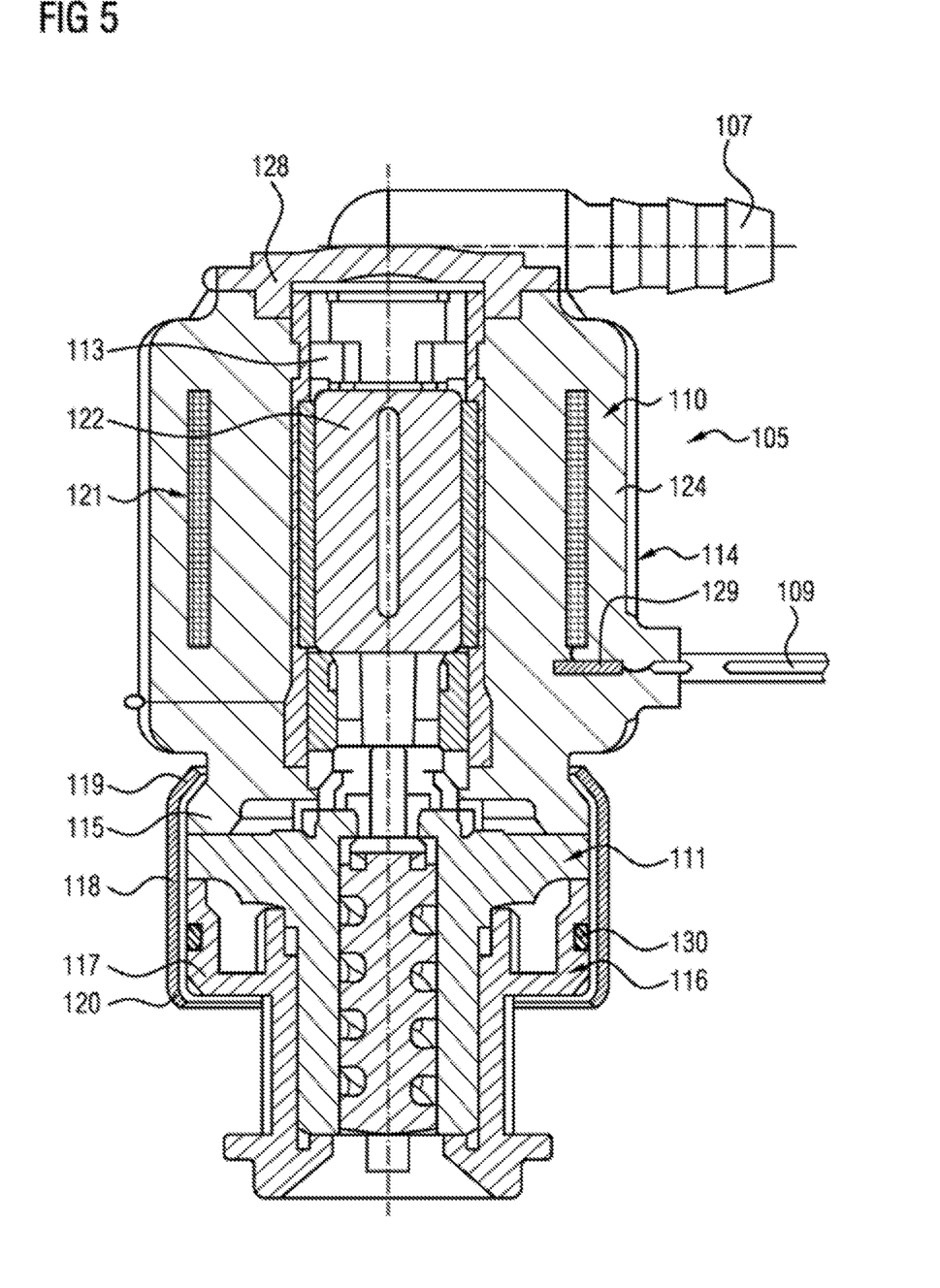
FIG. 5 shows a longitudinal section through a fuel pump of the fuel delivery unit.

FIG. 4 shows a further embodiment of a fuel delivery unit 102 with a fuel pump 105. FIG. 5 shows the fuel pump 105 in a longitudinal section. This fuel pump differs from that in FIGS. 1 to 3 in that a fuel-conducting channel 113 is led away through an end side, averted from a pump stage 11, of an electric motor 110. A cover 128 that closes off the end side bears a connector piece 107 for a fuel line and is sealed off with respect to a portion 124, made of plastic, of the motor housing 114. Connection lines 109 leading to the electric motor 110 lead radially into a portion 104, made of plastic, of the motor housing 114. Connection contacts 129 of the fuel pump 105 are encapsulated by this plastic portion. The pump housing 116 is supported radially relative to a sheet-metal casing 118 by a sealing ring 130. By rolled portions 119, 120, the sheet-metal casing 118 preloads an edge 115 of the motor housing 114 and an edge 117 of the pump housing 116 toward one another. The edge 115 of the motor housing 114 is, as viewed from the stator 121, arranged on the side facing toward the pump housing 116. A rotor 122 is arranged in the pump stage 111 and in the plastic portion 124 of the motor housing 114.

In the case of the fuel pumps 5, 105 from FIGS. 1 to 5, the pump stages 11, 111 are formed as screw pumps. Two screw spindles of the pump stages 11, 111 form, in conjunction with the pump housing 16, 116, delivery chambers that move from a suction side to a pressure side of the pump stage 11, 111 due to the rotation of the screw spindles. In an alternative embodiment, which is not illustrated, the pump stages may also be in the form of a side-channel or a peripheral pump.

Figure 6:
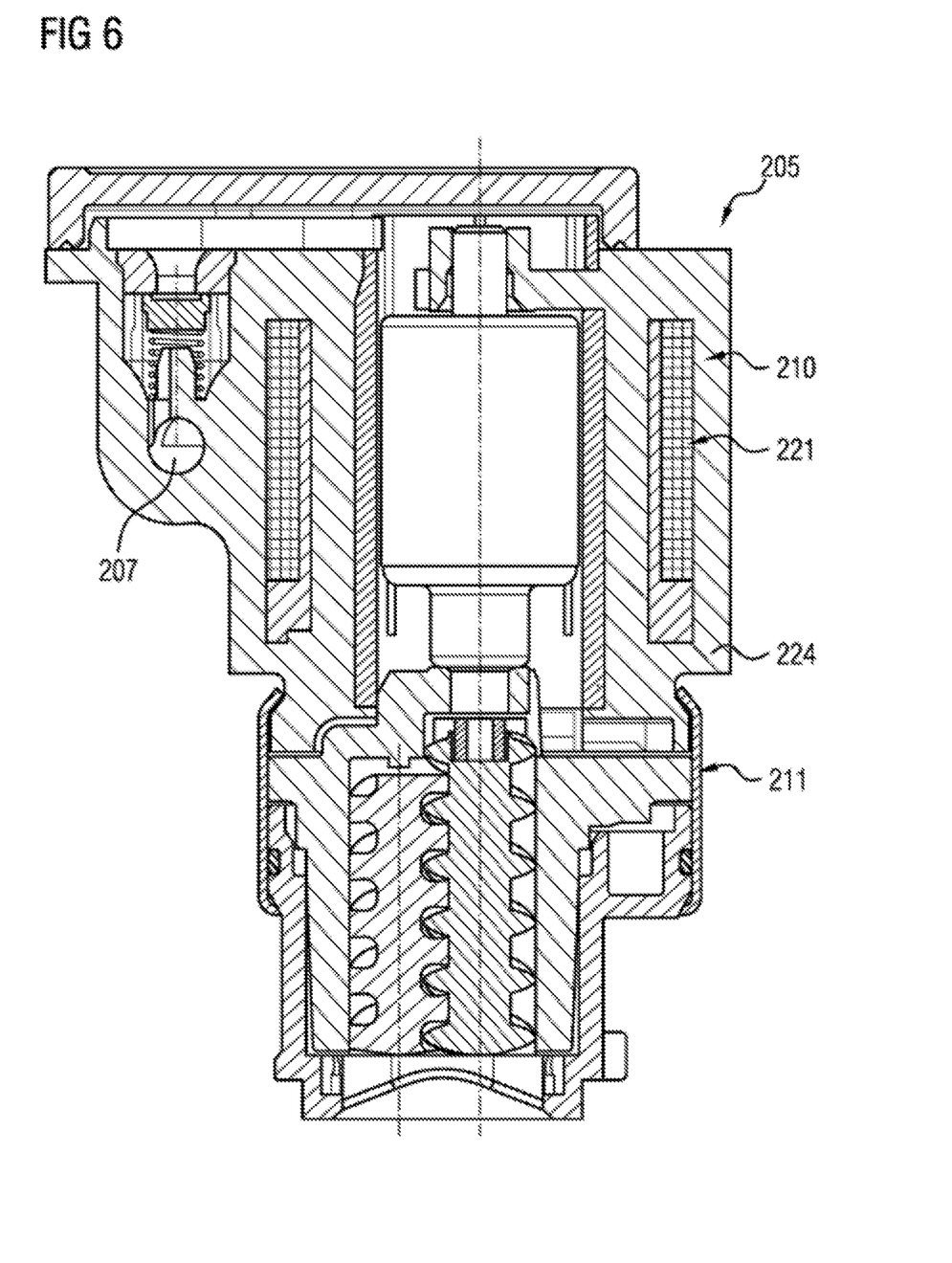
FIG. 6 shows a longitudinal section through of the fuel pump.

FIG. 6 shows a longitudinal section through a further embodiment of a fuel pump 205. This differs from that in FIG. 2 in that a connector piece 207 for the feed line 8 illustrated in FIG. 1 is manufactured as a single piece with a portion 224, which holds a stator 221, of an electric motor 210.

Figure 7:
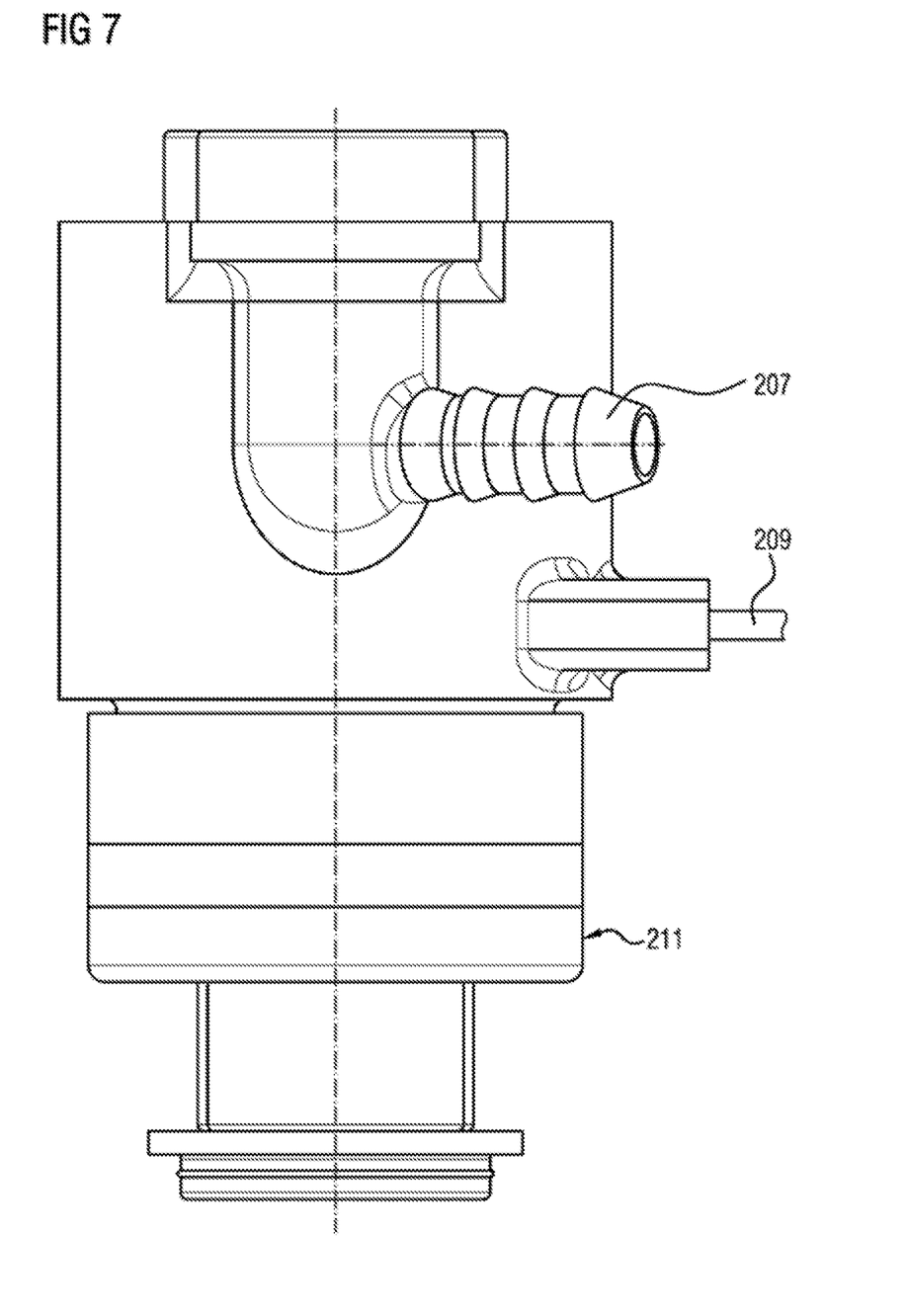
FIG. 7 shows a side view of the fuel pump from FIG. 6.

FIG. 7 shows a side view of the fuel pump 205 from FIG. 6. It can be seen here that connection lines 209 leading to the stator 221 are arranged closer than the connector piece 207 to a pump stage 211.

Figure 8:
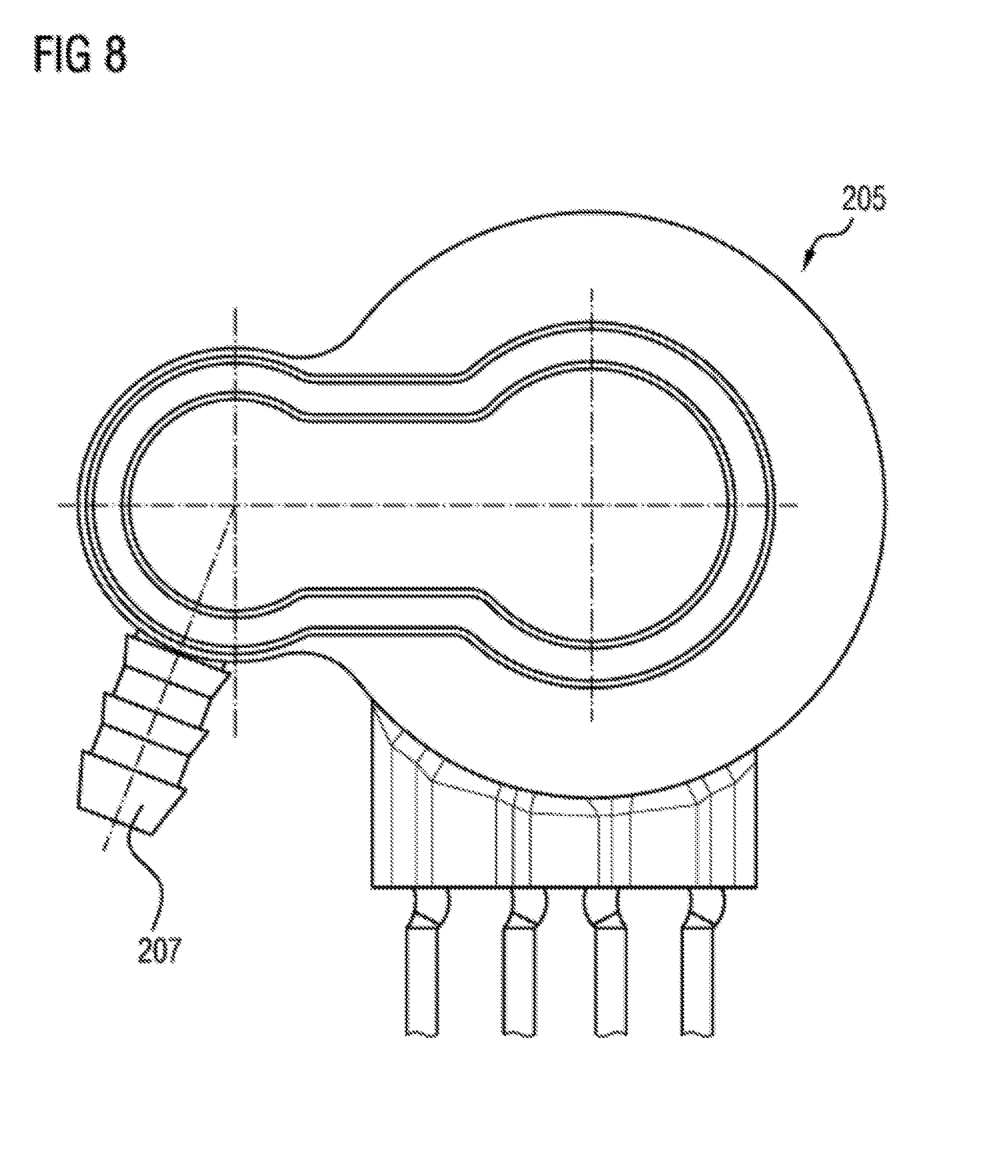
FIG. 8 shows a plan view of the fuel pump from FIG. 6.

FIG. 8 shows, in a plan view of the fuel pump 205 from FIG. 6, that the connector piece 207 is angled in relation to axes of symmetry of the fuel pump 205. The embodiment of the fuel pump 205 as per FIGS. 6 to 8 is otherwise constructed substantially similarly to that from FIGS. 1 to 3.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A fuel pump (5, 105, 205) comprises:
   an electric motor (10, 110, 210), the electric motor having a rotor (22, 122) and a stator (21, 121, 221) that surrounds the rotor (22, 122);
   a pump stage (11, 111, 211);
   a motor housing (14, 114) of the electric motor (10, 110, 210), and having a motor housing edge (15, 115);
   a pump housing (16, 116) of the pump stage (11, 111), and having a pump housing edge (17, 117); and
   a preload element which preloads the motor housing (14, 114) and the pump housing (16, 116) against one another,
   wherein the motor housing (14, 114) is configured and arranged to hold the stator (21, 121, 221), and to hold a fuel discharge connector (7, 107, 207), wherein at least one selected from the group of the fuel discharge connector (7, 107, 207) and connection lines (9, 109, 209) leading to the electric motor (10, 110, 210) are led into the electric motor (10, 110, 210) via a shell surface of the motor housing (14, 114),
   wherein the fuel discharge connector (7, 207) is arranged at an axial height of coils (23) or permanent magnets of the stator (21, 221),
   wherein the motor housing (14, 114) has a portion (24, 124, 224) made of plastic that holds the stator (21, 121, 221),
   wherein the plastic portion (24, 124, 224) of the motor housing (14, 114) that holds the stator (21, 121, 221) has an open side, facing the pump housing (16, 116), into which the rotor (22, 122) is insertable, and
   wherein the plastic portion (24, 124, 224) of the motor housing (14, 114) has support arms (26) configured and arranged to support a bearing arrangement (25) of the rotor (22, 122), and wherein a fuel-conducting channel (13, 113) leads through between the support arms (26).

2. The fuel pump as claimed in claim 1, wherein the rotor (22, 122) of the electric motor (10, 110, 210) is mounted with a first end on the pump housing (16, 116) and with a second end in the plastic portion (24, 124) of the motor housing (14, 114).

3. The fuel pump as claimed in claim 1, further comprising a sealing ring (30, 130) with radial sealing action arranged between the pump housing (16, 116) and the sheet-metal casing (18, 118).

* * * * *